United States Patent
Kwon et al.

(10) Patent No.: US 10,219,183 B2
(45) Date of Patent: Feb. 26, 2019

(54) METHOD AND DEVICE FOR ADJUSTING DATA TRANSMISSION RATE IN WIRELESS COMMUNICATION SYSTEM

(71) Applicant: LG ELECTRONICS INC., Seoul (KR)

(72) Inventors: Younghwan Kwon, Seoul (KR); Jaeho Lee, Seoul (KR); Minsoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 155 days.

(21) Appl. No.: 15/125,498

(22) PCT Filed: Dec. 9, 2014

(86) PCT No.: PCT/KR2014/012070
§ 371 (c)(1),
(2) Date: Sep. 12, 2016

(87) PCT Pub. No.: WO2015/137601
PCT Pub. Date: Sep. 17, 2015

(65) Prior Publication Data
US 2017/0086098 A1   Mar. 23, 2017

Related U.S. Application Data

(60) Provisional application No. 61/951,547, filed on Mar. 12, 2014.

(51) Int. Cl.
*H04W 28/22* (2009.01)
*H04L 12/807* (2013.01)
(Continued)

(52) U.S. Cl.
CPC ............. *H04W 28/22* (2013.01); *H04L 47/27* (2013.01); *H04W 4/80* (2018.02);
(Continued)

(58) Field of Classification Search
CPC . H04W 28/22; H04W 28/0221; H04W 76/10; H04W 4/80; H04W 28/065; H04L 47/27
See application file for complete search history.

(56) References Cited

U.S. PATENT DOCUMENTS

2006/0155856 A1* 7/2006 Nakashima ........... H04W 84/12
709/227
2009/0245279 A1   10/2009 Wan et al.
(Continued)

FOREIGN PATENT DOCUMENTS

CN         1494296 A      5/2004
CN       101841394 A      9/2010
(Continued)

OTHER PUBLICATIONS

Author Unknown, "Specification of the Bluetooth® System," Specification vol. 0, Covered Core Package Version: 4.1, Dec. 3, 2013, 2683 pages.

*Primary Examiner* — Anez C Ebrahim
(74) *Attorney, Agent, or Firm* — Birch, Stewart, Kolasch & Birch, LLP

(57) ABSTRACT

The present invention relates to a method and apparatus for extending a data length of Bluetooth communication. A method of extending a data length of Bluetooth communication according to the present invention includes receiving a first message including information of a second device from the second device, transmitting a connection request message to the second device based on the first message, performing Bluetooth connection with the second device based on the connection request message, transmitting an extension request message which requests extension of a transmission data length and a reception data length through the connected Bluetooth, and receiving an extension response message in response to the request message through the connected Bluetooth, wherein the request mes- (Continued)

sage includes at least one of first maximum transmission data length information, first maximum reception data length information, first maximum transmission time information, or first maximum reception time information of the first device, and wherein the response message includes at least one of second maximum transmission data length information, second maximum reception data length information, second maximum transmission time information, or second maximum reception time information of the second device.

12 Claims, 17 Drawing Sheets

(51) Int. Cl.
| | | |
|---|---|---|
| *H04W 28/02* | (2009.01) | |
| *H04W 28/06* | (2009.01) | |
| *H04W 4/80* | (2018.01) | |
| *H04W 76/10* | (2018.01) | |
| *H04W 84/18* | (2009.01) | |
| *H04W 72/04* | (2009.01) | |

(52) U.S. Cl.
CPC ..... *H04W 28/0221* (2013.01); *H04W 28/065* (2013.01); *H04W 76/10* (2018.02); *H04W 72/0446* (2013.01); *H04W 84/18* (2013.01)

(56) References Cited

U.S. PATENT DOCUMENTS

| | | |
|---|---|---|
| 2010/0020729 A1 | 1/2010 | Walley et al. |
| 2012/0052802 A1 | 3/2012 | Kasslin et al. |
| 2013/0065584 A1 | 3/2013 | Lyon et al. |
| 2013/0288604 A1 | 10/2013 | Chang et al. |
| 2013/0304794 A1 | 11/2013 | Verma et al. |
| 2014/0057564 A1* | 2/2014 | Palin ............... H04W 8/005 455/41.2 |
| 2014/0059235 A1 | 2/2014 | Palin et al. |

FOREIGN PATENT DOCUMENTS

| | | |
|---|---|---|
| CN | 102006215 A | 4/2011 |
| WO | WO 2012/033340 A2 | 3/2012 |
| WO | WO 2012/096546 A2 | 7/2012 |
| WO | WO 2012/178107 A1 | 12/2012 |

* cited by examiner

[FIG. 1]
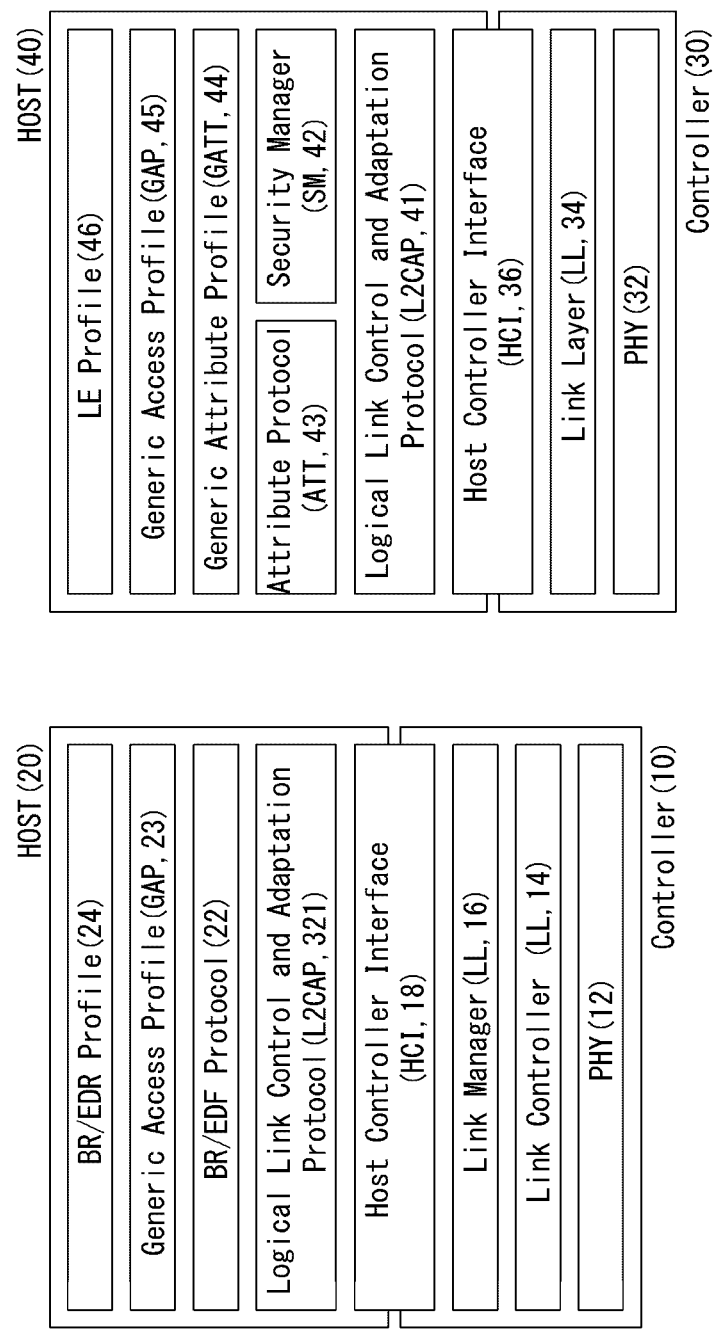

[FIG. 2]
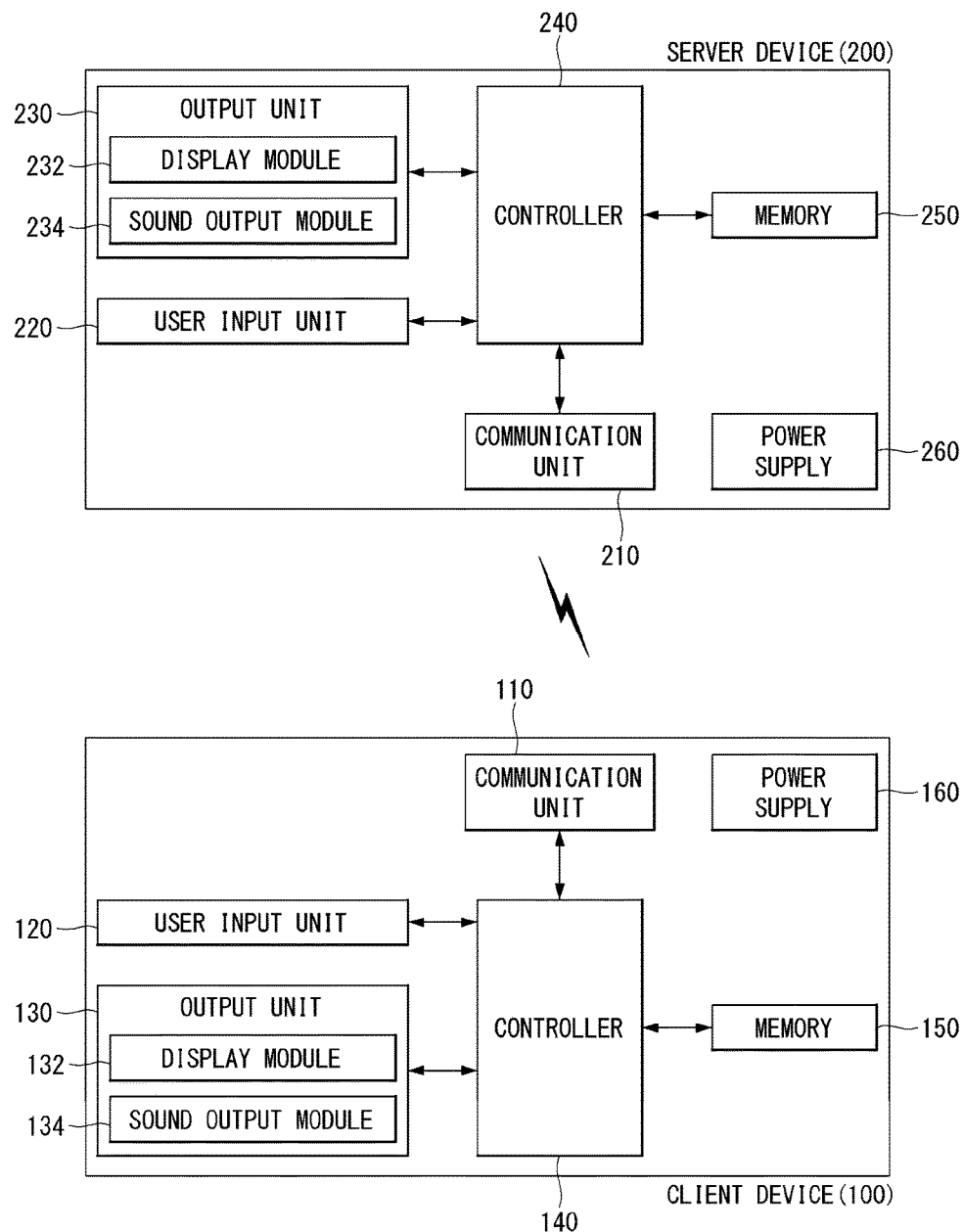

[FIG. 3]
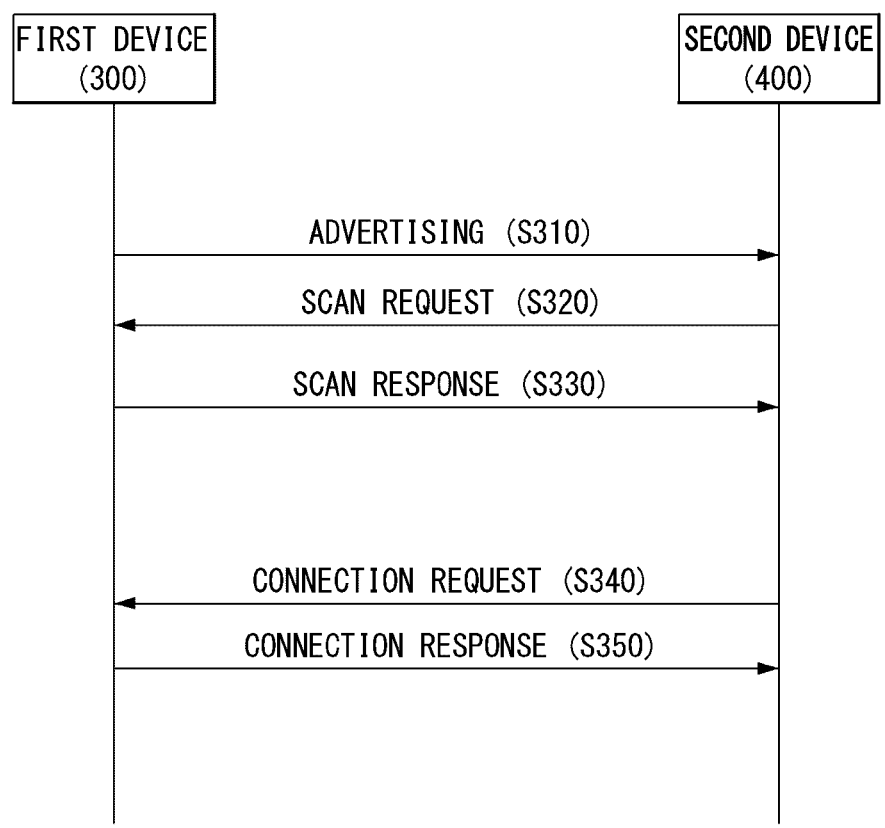

[FIG. 4]
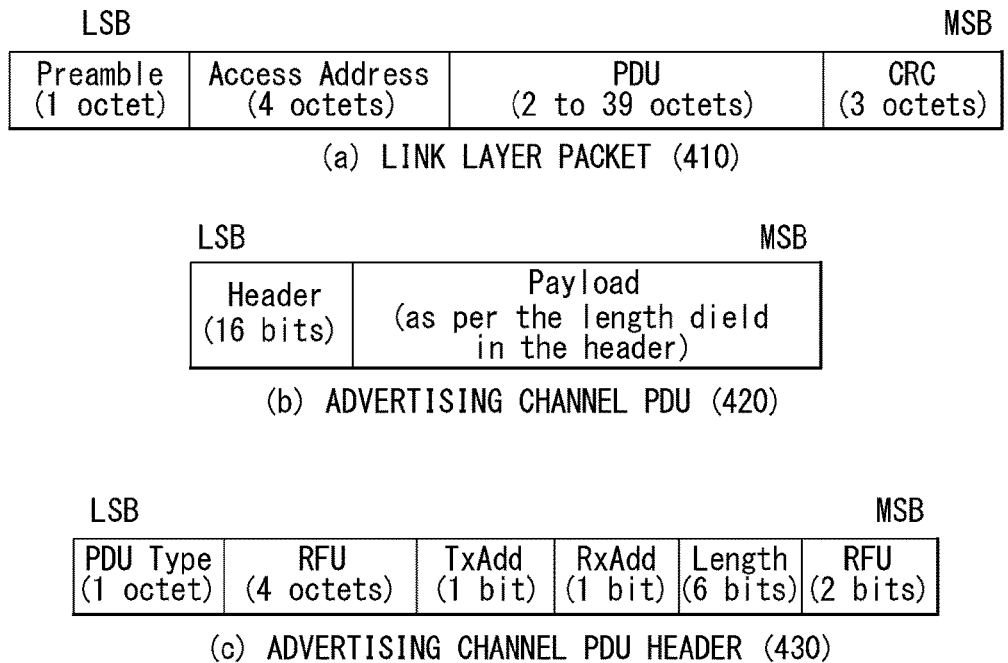
(a) LINK LAYER PACKET (410)
(b) ADVERTISING CHANNEL PDU (420)
(c) ADVERTISING CHANNEL PDU HEADER (430)
[FIG. 5]
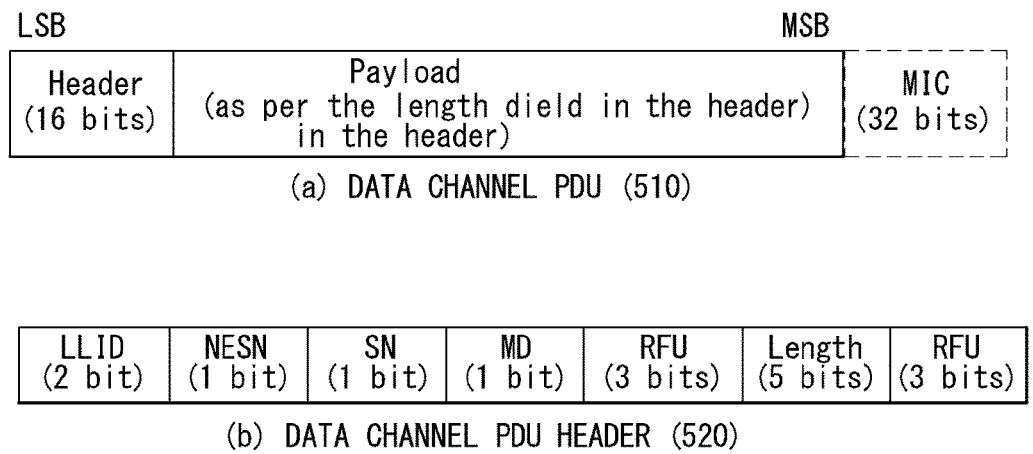
(a) DATA CHANNEL PDU (510)
(b) DATA CHANNEL PDU HEADER (520)

[FIG. 6]
| LSB | | | | MSB |
|---|---|---|---|---|
| Preamble (1 octet) | Access Address (4 octets) | PDU (최대 249 octets) | | CRC (3 octets) |
(a) LINK LAYER PACKET (610)
| LSB | | | | | MSB |
|---|---|---|---|---|---|
| PDU Type (1 octet) | RFU (4 octets) | Long Length (1 bits) | TxAdd (1 bit) | RxAdd (1 bit) | Length (8 bits) |
(b) ADVERTISING CHANNEL PDU HEADER (620)
| LSB | | | | | | MSB |
|---|---|---|---|---|---|---|
| LLID (2 bit) | NESN (1 bit) | SN (1 bit) | MD (1 bit) | Long Length (1 bit) | RFU (3 bits) | Length (8 bits) |
(c) DATA CHANNEL PDU HEADER (630)
[FIG. 7]
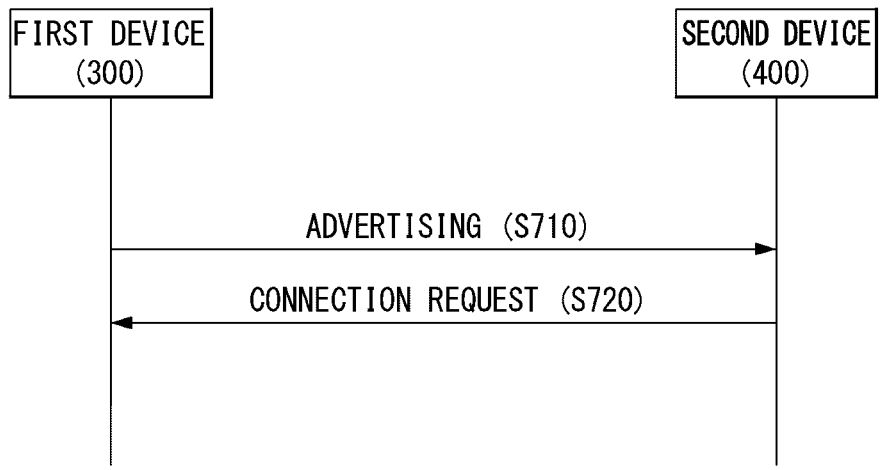

[FIG. 8]

| AdvA (6 octets) | Adv Data (0 - 31 octets) |

(a) ADVERTISING CHANNEL PDU PAYLOAD (810)

| AdvA (6 octets) | InitA (6 octets) | Adv Data (0 - 25 octets) |

(b) ADVERTISING CHANNEL PDU PAYLOAD (820)

| AdvData Type (2 bit) | Maximum RX LE Payload Size (1 octets) | Maximum TX LE Payload Size (1 octets) |

(c) ADV DATA OF ADVERTISING CHANNEL PDU (830)

[FIG. 9]

| InitA (6 octets) | AdvA (6 octets) | LL Data (0 - 25 octets) |

| Tx Payload Size (1 octets) | Rx Payload Size (1 octets) | Maximum RX LE Payload Size (1 octets) | Maximum TX LE Payload Size (1 octets) |

DATA CHANNEL PDU PAYLOAD (910)

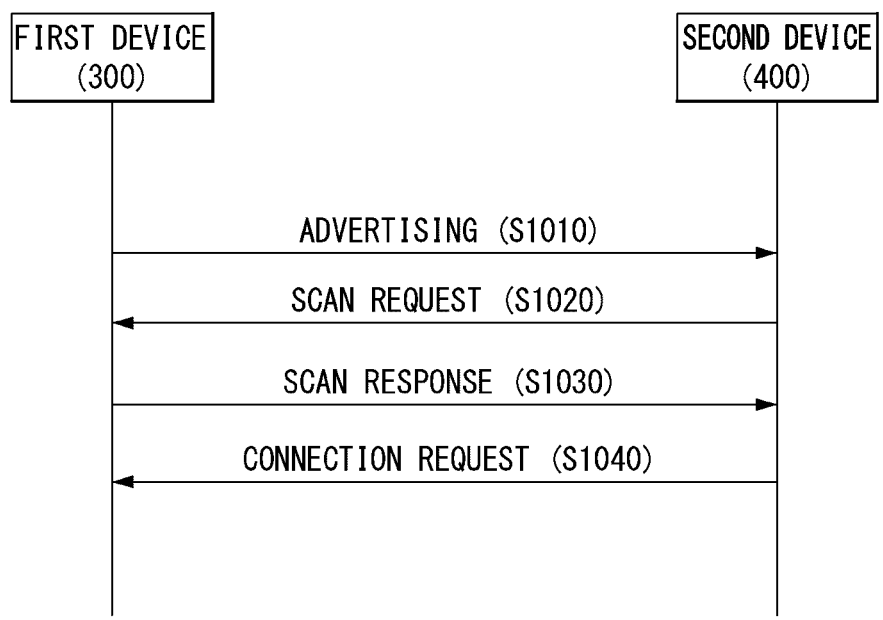
[FIG. 10]

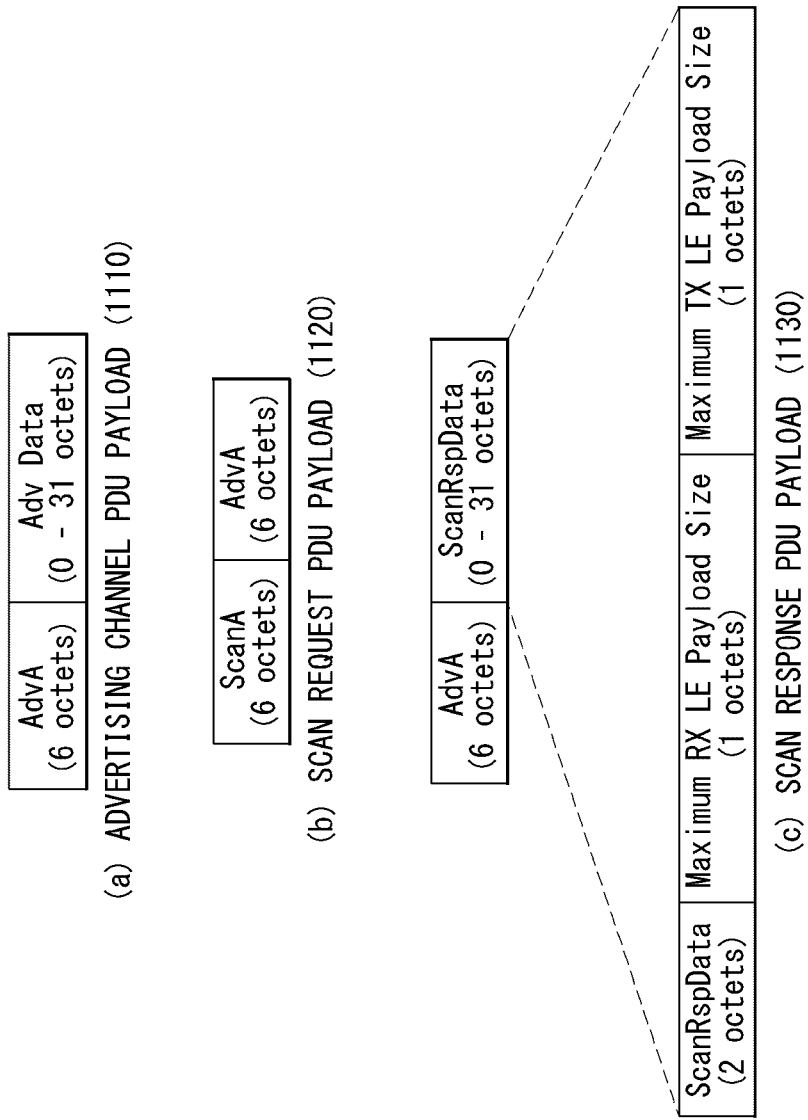

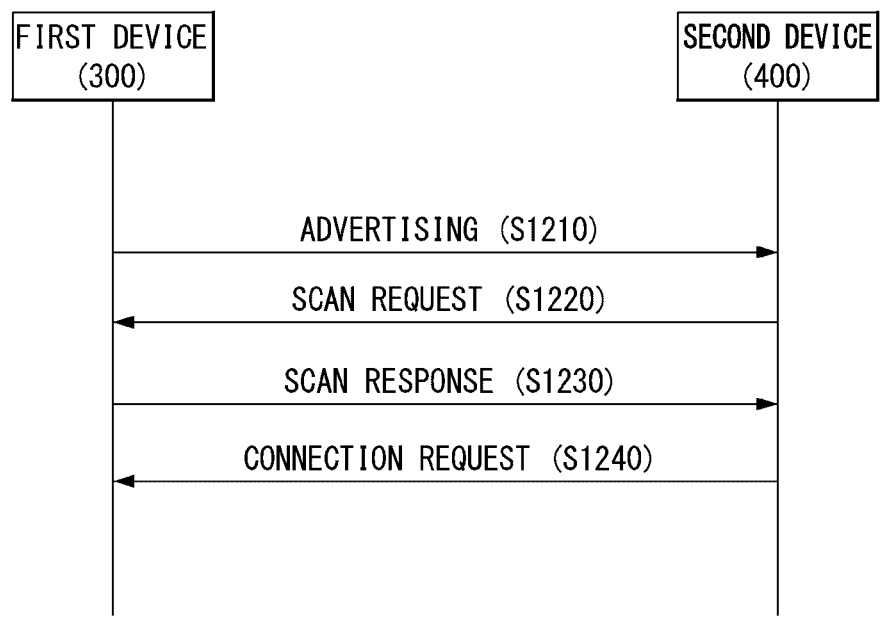
[FIG. 12]

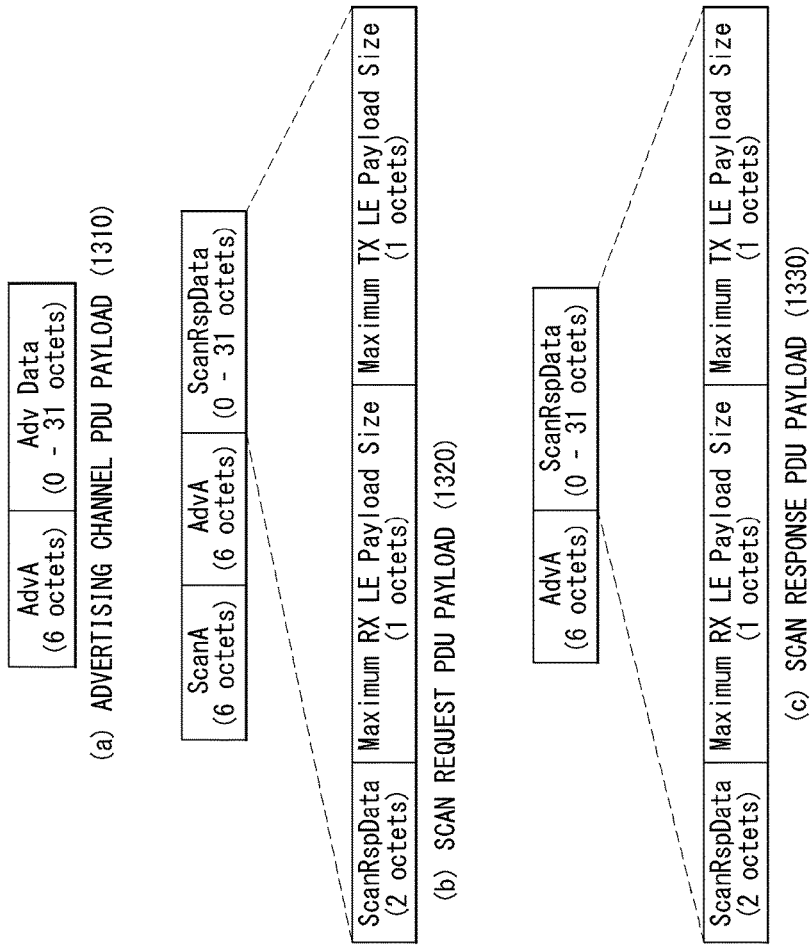

[FIG. 14]
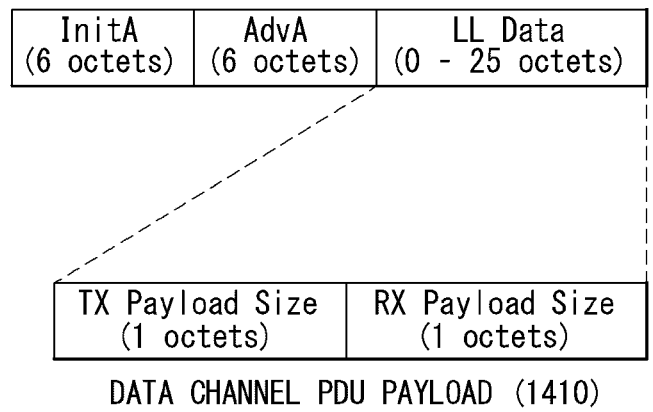
DATA CHANNEL PDU PAYLOAD (1410)
[FIG. 15]
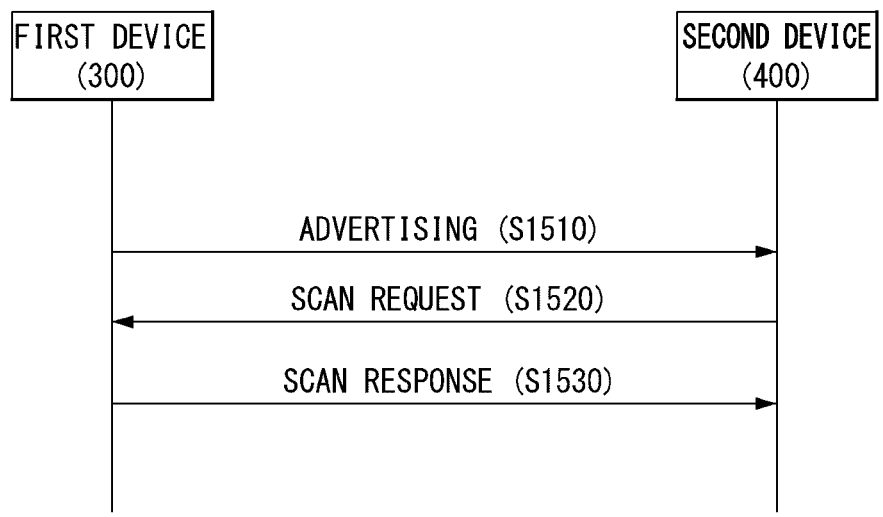

[FIG. 16]

| AdvA (6 octets) | Adv Data (0 - 31 octets) |

| AdvData Type (2 octets) | Maximum RX LE Payload Size (1 octets) | Maximum TX LE Payload Size (1 octets) |

(a) ADVERTISING CHANNEL PDU PAYLOAD (1610)

| ScanA (6 octets) | AdvA (6 octets) | ScanRspData (0 - 31 octets) |

| ScanRspType (2 octets) | Maximum RX LE Payload Size (1 octets) | Maximum TX LE Payload Size (1 octets) |

(b) SCAN REQUEST PDU PAYLOAD (1620)

| AdvA (6 octets) | ScanRspData (0 - 249 octets) |

(c) SCAN RESPONSE PDU PAYLOAD (1630)

[FIG. 17]
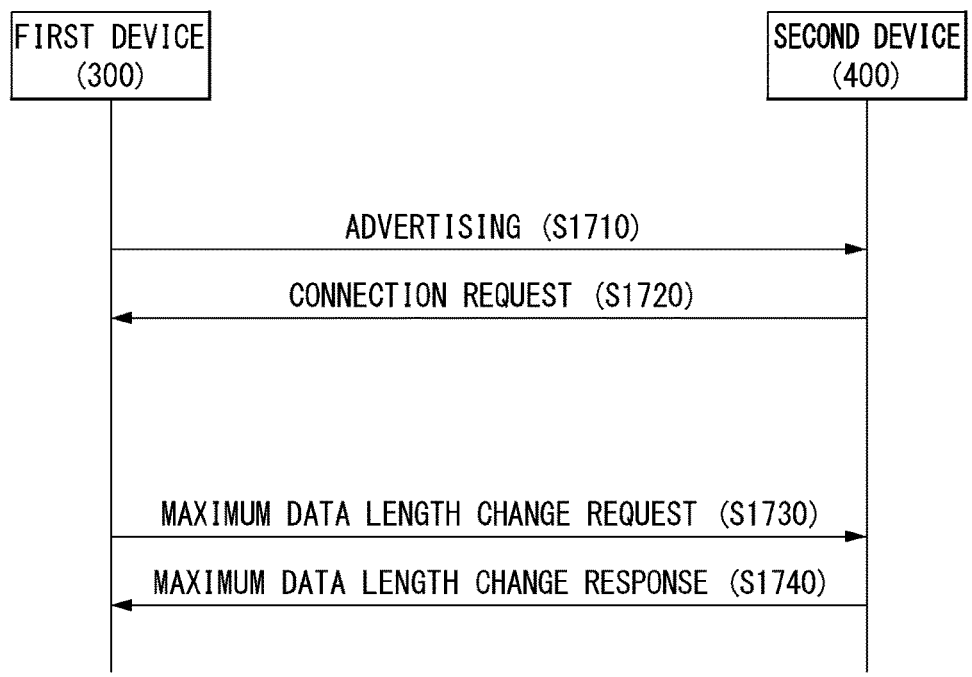

[FIG. 18]
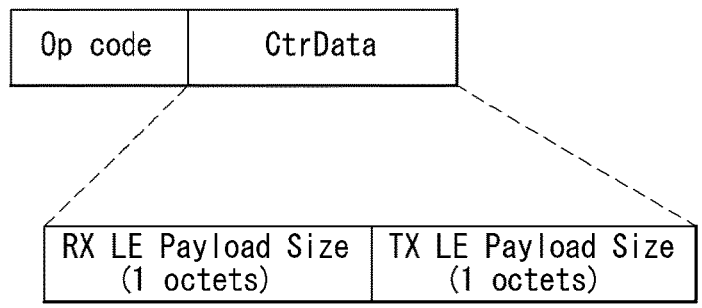
(a) MAXIMUM DATA LENGTH CHANGE REQUEST (1810)
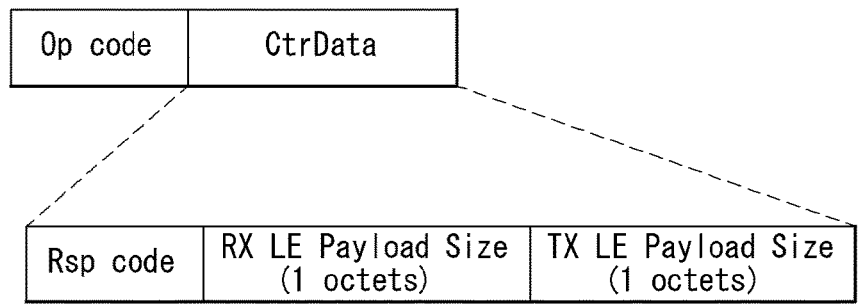
(b) MAXIMUM DATA LENGTH CHANGE RESPONSE (1820)

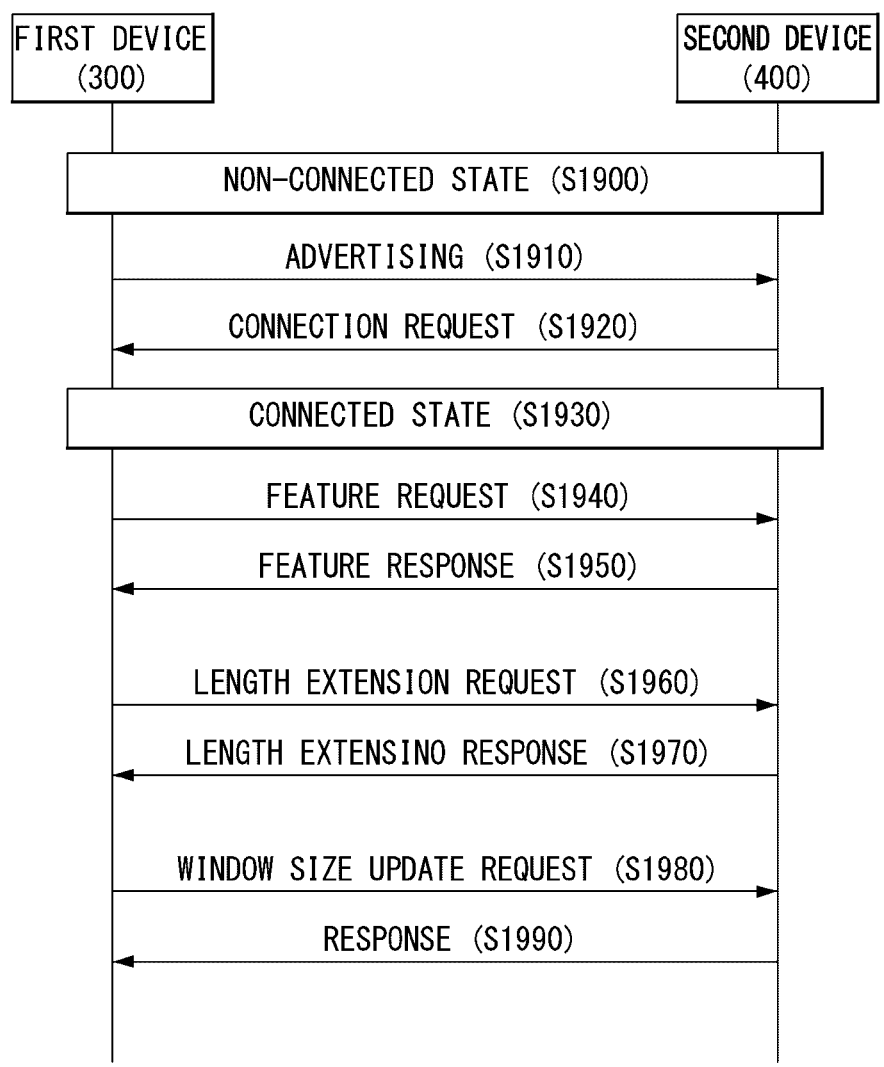
[FIG. 19]

[FIG. 20]
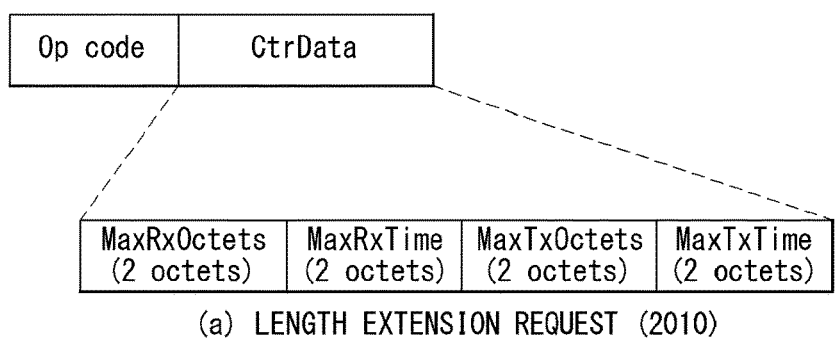
(a) LENGTH EXTENSION REQUEST (2010)
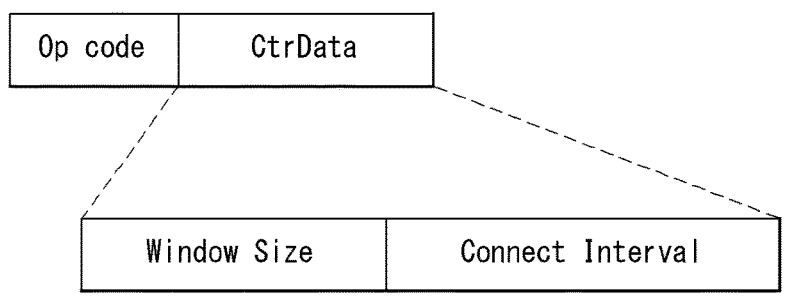
(b) WINDOW SIZE UPDATE REQUEST (2020)

METHOD AND DEVICE FOR ADJUSTING DATA TRANSMISSION RATE IN WIRELESS COMMUNICATION SYSTEM

CROSS REFERENCE TO RELATED APPLICATIONS

This application is the National Phase of PCT International Application No. PCT/KR2014/012070, filed on Dec. 9, 2014, which claims priority under 35 U.S.C. 119(e) to U.S. Provisional Application No. 61/951,547, filed on Mar. 12, 2014, all of which are hereby expressly incorporated by reference into the present application.

TECHNICAL FIELD

The present invention relates to a method and apparatus for adjusting the data transmission rate in a wireless communication system, and more particularly, to a method and apparatus for enhancing the data transmission rate in Bluetooth communication.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

Bluetooth low energy (Bluetooth LE) technology can stably provide information of hundreds of kilobytes by consuming less power. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

However, in the Bluetooth LE technology, the amount of data, which may be transmitted, has decreased compared to the existing Bluetooth BR/EDR, and thus when a large amount of data is transmitted, it takes long time and Bluetooth module needs to be continually activated, thereby increasing power consumption.

DISCLOSURE

Technical Problem

An object of the present invention is to provide a method of changing the data transmission rate in Bluetooth communication.

Another object of the present invention is to provide a method of improving the data transmission rate in Bluetooth communication.

Yet another object of the present invention is to provide a method of negotiating a packet length in order to improve the date transmission rate in the Bluetooth initial paring operation.

Yet another object of the present invention is to provide a method of changing the data transmission rate during data transmission after Bluetooth connection.

Yet another object of the present invention is to provide a method of negotiating a packet length in order to improve the data transmission rate during data transmission after Bluetooth connection.

Technical Solution

In order to solve the above-described problems, the present invention provides a method and apparatus for extending the data length of Bluetooth communication. Specifically, a method of extending the data length according to an embodiment of the present invention includes: receiving a first message including information of a second device from the second device; transmitting a connection request message to the second device based on the first message; performing Bluetooth connection with the second device based on the connection request message; transmitting an extension request message which requests extension of a transmission data length and a reception data length through the connected Bluetooth; and receiving an extension response message in response to the request message through the connected Bluetooth, wherein the request message includes at least one of first maximum transmission data length information, first maximum reception data length information, first maximum transmission time information, or first maximum reception time information of the first device, and wherein the response message includes at least one of second maximum transmission data length information, second maximum reception data length information, second maximum transmission time information, and second maximum reception time information of the second device.

Further, the method further includes negotiating the transmission data length and the reception data length, wherein the transmission data length may be negotiated based on at least one of third maximum transmission data length information and third maximum transmission time information, and wherein the reception data length may be negotiated based on at least one of third maximum reception data length information and third maximum reception time information.

Here, third maximum transmission data length information may be determined by negotiation as a smaller value among the first maximum transmission data length information and the second maximum reception data length information, the third maximum transmission time information may be determined by negotiation as a smaller value among the first maximum transmission time information and the second maximum reception time information, the third maximum reception data length information may be determined by negotiation as a smaller value among the first maximum reception data length information and the second maximum transmission data length information, and the third maximum reception time information may be determined by negotiation as a smaller value among the maximum reception time information and the second maximum transmission time information.

Here, the connection request message may include at least one of window size information, window offset information, or connect interval information.

Here, the method further includes transmitting a window size update request message for changing a window size; and receiving a response message as a response to the window size update request message.

Further, a method of changing a data length of Bluetooth communication by a first device in a wireless communication system according to an embodiment of the present invention includes: receiving first information related with whether extension of a transmission data length and a reception data length is supported, from a second device; receiving second information related with a data length of the second device from the second device; negotiating the data length based on the second information and third information related with a data length of the first device; and transmitting the negotiated data length to the second device, wherein the second information includes at least one of first maximum transmission data length information, first maximum reception data length information, first maximum transmission time information, and first maximum reception time information, and wherein the third information includes at least one of second maximum transmission data length information, second maximum transmission time information, and second maximum reception time information.

Here, the negotiated data length may include at least one of a transmission data length, a reception data length, transmission time, and reception time.

Here, the transmission data length may indicate a smaller value among the second maximum transmission data length information and the first maximum reception data length information, the reception data length may indicate a smaller value among the second maximum reception data length information and the first maximum transmission data length information, the transmission time may indicate the second maximum transmission time information and the first maximum reception time information, and the reception time may indicate a smaller value among the second maximum reception time information and the first maximum transmission time information.

Here, the first information and the second information may be included in one message so as to be simultaneously transmitted.

The method further includes transmitting a request message which requests the second information.

The method further includes: transmitting a change request message which requests a change of the negotiated data length; and receiving a change request response message in response to the change request message.

Here, the change request message may include at least one of first reception data length information and first transmission data information, and the change response message may include at least one of response information related with whether the change request is allowed, second reception data length information, and second transmission data length information.

Here, the second reception data length information may be determined based on the first reception data length information, and the second transmission data length information may be determined based on the first transmission data length information.

An apparatus for extending a data length of Bluetooth communication including a first device in a wireless communication system according to an embodiment of the present invention is provided, wherein the first device may include: a communication unit for transmitting and receiving a signal in a wired way and/or in a wireless way with an external side; and a controller which is functionally connected to the communication unit, wherein the controller may receive a first message including information of the second device from a second device, transmit a connection request message to the second device based on the first message, perform Bluetooth connection with the second device based on the connection request message, transmit an extension request message which requests extension of a transmission data length and a reception data length through the connected Bluetooth, and receive an extended response message in response to the request message through the connected Bluetooth, wherein the request message may include at least one of first maximum transmission data length information, first maximum reception data length information, first maximum transmission time information, and first maximum reception time information of the first device, and wherein the response message may include at least one of second maximum transmission data length information, second maximum reception data length information, second maximum transmission time information, and second maximum reception time information of the second device.

Here, the controller may negotiate a transmission data length and a reception data length, the transmission data length may be negotiated based on at least one of third maximum transmission data length information and third maximum transmission time information, and the reception data length may be negotiated based on at least one of third maximum reception data length and third maximum reception time information.

Here, third maximum transmission data length information may be determined by negotiation as a smaller value among the first maximum transmission data length information and the second maximum reception data length information, the third maximum transmission time information may be determined by negotiation as a smaller value among the first maximum transmission time information and the second maximum reception time information, the third maximum reception data length information may be determined by negotiation as a smaller value among the first maximum reception data length information and the second maximum transmission data length information, and the third maximum reception time information may be determined by negotiation as a smaller value among the maximum reception time information and the second maximum transmission time information.

Here, the connection request message may include at least one of window size information, window offset information, or connect interval information.

Here, the controller may transmit a window size update request message for changing a window size and receives a response message in response to the window size update request message.

An apparatus for extending a data length of Bluetooth communication including a first device in a wireless communication system according to an embodiment of the present invention includes: a communication unit for transmitting and receiving a signal in a wired way and/or in a wireless way with an external side; and a controller which is functionally connected to the communication unit, wherein the controller receives first information related with whether extension of a transmission data length and a reception data length is supported, from a second device, receives second information related with a data length of the second device from the second device, negotiates the data length based on the second information and third information related with a data length of the first device, and transmits the negotiated data length to the second device, wherein the second information includes at least one of first maximum transmission data length information, first maximum reception data length information, first maximum transmission time information, and first maximum reception time information, and wherein the third information includes at least one of second maximum transmission data length information, second maximum transmission time information, and second maximum reception time information.

Advantageous Effects

According to a method of changing the Bluetooth data transmission rate according to an embodiment of the present invention, the data transmission rate may be improved by negotiating a packet length.

Further, according to a method of changing the Bluetooth data transmission rate according to an embodiment of the present invention, as the date transmission rate is improved through packet length negotiation, the data transmission time may be reduced.

Further, according to a method of changing the Bluetooth data transmission rate according to an embodiment of the present invention, as the amount of data, which may be transmitted at one time through the packet length negotiation, increases, the data transmission rate may be improved, thereby reducing power consumption of Bluetooth device.

Further, according to a method of changing the Bluetooth data transmission rate according to an embodiment of the present invention, the transmission rate of data, which may be transmitted by a scanning request response through a packet length negotiation in the pairing operation, is improved, thereby increasing the data transmission rate of Bluetooth device.

Further, according to a method of changing the Bluetooth data transmission rate according to an embodiment of the present invention, a large amount of data may be transmitted through packet length negotiation after Bluetooth connection, and thereby the data transmission speed may be improved and the power consumption of the Bluetooth device may be reduced.

Further, according to a method of changing the Bluetooth data transmission rate according to an embodiment of the present invention, the data transmission rate may be changed according to the amount of data to be transmitted through packet length negotiation after Bluetooth connection, and thus efficient data transmission is possible.

DESCRIPTION OF DRAWINGS

FIG. 1 is a diagram showing a protocol stack provided for Bluetooth communication to which an embodiment of the present invention may be applied.

FIG. 2 is a diagram showing an example of an internal block of a device to which an embodiment of the present invention may be applied.

FIGS. 3 to 5 are diagrams showing a general connection process of Bluetooth and an example of a packet format.

FIG. 6 is a diagram showing an example of a packet format for improving the data transmission rate to which an embodiment of the present invention may be applied.

FIGS. 7 to 9 are diagrams showing a process of negotiating a packet length in the Bluetooth connection process and an example of a packet format to which an embodiment of the present invention may be applied.

FIGS. 10 and 11 are diagrams showing a process for negotiating a packet length through a scanning request and a scanning response in the Bluetooth connection process and an example of a packet format to which an embodiment of the present invention may be applied.

FIGS. 12 to 14 are diagrams showing a process for negotiating a packet length through a scanning request and a scanning response in the Bluetooth connection process and an example of a packet format to which another embodiment of the present invention may be applied.

FIGS. 15 and 16 are diagrams showing a process for using an extended scan response through a packet length negotiation in the Bluetooth connection process and an example of a packet format to which an embodiment of the present invention may be applied.

FIGS. 17 and 18 are diagrams showing a process for changing a packet length after Bluetooth connection and a packet format to which an embodiment of the present invention may be applied.

FIGS. 19 and 20 are diagram showing a process for extending a packet length after Bluetooth connection and a packet format thereabout to which an embodiment of the present invention may be applied.

MODE FOR INVENTION

Hereinafter, in this specification, the contents related to the present invention will be described in detail in connection with exemplary embodiments with reference to the accompanying drawings. It is to be noted that in assigning reference numerals to respective elements in the drawings, the same reference numerals designate the same elements throughout the drawings although the elements are shown in different drawings. Furthermore, in describing the embodiments of the present invention, a detailed description of the known functions and constructions will be omitted if it is deemed to make the gist of the present invention unnecessarily vague.

Hereinafter, the methods and apparatuses related with the present invention will be described in detail with reference to drawings. The terms "module" and "unit" for components which may be used in the description below are used only for the convenience of description and the terms themselves do not have a distinctive meaning or role.

The electronic devices, which are explained in the present specification, may include a mobile phone, a smartphone, a laptop computer, a terminal for a digital broadcast, a personal digital assistant (PDA), a portable multimedia player (PMP), and a navigation system. However, it may be easily understood by one of ordinary skill in the art that the configurations according to the embodiments which are disclosed in the present specification may also be applied to fixed terminals such as a digital TV and a desktop computer except for the cases which can applied only to mobile terminals.

Signals, which are explained in the present specification, may also be transmitted in the form of frames as well as messages.

FIG. 1 is a diagram showing a protocol stack provided for Bluetooth communication to which an embodiment of the present invention may be applied.

Referring to FIG. 1, (a) shows an example of a protocol stack of Bluetooth basic rate (BR)/enhanced data rate (EDR), and (b) indicates an example of a protocol stack of Bluetooth low energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

- The link manager layer 16 may perform ACL/SCO logical transport, logical link setup, and control
- Detach: The link manager layer 16 stops connection and informs a counterpart device about the reason for stopping connection.
- The link manager layer 16 performs power control and role switch.
- The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, a BR/EDR protocol 22, a general access profile (GAP) 23, and a BR/EDR profile 24.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The BR/EDR protocol 22 and profiles 24 define a service which uses Bluetooth BR/EDR and defines an application protocol for exchanging these data, and the general access profile (GAP) 23 defines a method to discover and connect a device and provide information to user and provides privacy.

As illustrated in (b) of FIG. 1, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 42 bytes through thirty-seven data channels.

The host stack may include a generic access profile (GAP) 40, a logical link control and adaptation protocol (L2CAP) 41, a security manager (SM) 42, an attribute protocol (ATT) 43, a generic attribute profile (GATT) 44, a generic access profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In Bluetooth LE, three fixed channels (one for signaling CH, one for security manager, and one for attribute protocol) are used.

On the other hand, in BR/EDR, a dynamic channel is used, and a protocol service multiplexer, retransmission, and streaming mode are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Internal Block Diagram of Device

FIG. 2 is a diagram showing an example of an internal block of a device to which an embodiment of the present invention may be applied.

A server device 200 refers to a device which directly communicates with a client device 100, receives a request, and provides data through a response. The service device 200 transmits a notification and indication message to the client device 100 in order to provide data information, and when transmitting the indication message, the confirmation message may be received from the client device 100.

One service device may be connected to a plurality of client devices, and may be easily connected with client devices by utilizing bonding information.

The client device 100 refers to an apparatus which requests data information and transmission to the server device 200. The client device 100 refers to a device which receives data transmitted from the server device 200 through the notification and indication message, and when the indication message is received, sends a confirm message.

The client device 100 and the server device 200 may respectively include a communication unit 110 and 210, a user input unit 120 and 220, an output unit 130 and 230, a controller 140 and 240, a memory 150 and 250, and a power supply unit 160 and 260.

The communication unit 110 and 210, the user input unit 120 and 220, the output unit 130 and 230, the controller 140 and 240, the memory 150 and 250, and the power supply unit 160 and 260 are functionally connected in order to perform the method suggested in the present invention.

The components illustrated in FIG. 2 are not essential, and thus it may be possible to have more or less components.

The communication unit 110 and 210 may include one or more modules which allow wireless communication between the device and the wireless communication system or between the device and the network where the device is located. For example, the communication unit 110 and 210 may include a broadcast receiving module (not shown), a mobile communication module (not shown), a wireless Internet module (not shown), and a short distance communication module (not shown).

The communication unit 110 and 210 may also be called a transmission/reception unit.

The mobile communication module exchanges radio signals with at least one of a base station, an external terminal or a server over a mobile communication network. The radio signal may include a variety of types of data according to the transmission and reception of voice call signals, video telephony call signals, or text/multimedia messages.

The wireless Internet module refers to a module for wireless Internet access. The wireless Internet module may be internal or external to a device. A Wireless LAN (WLAN) (Wi-Fi), a Wireless Broadband (WiBro), a World Interoperability for Microwave Access (WiMax), and High Speed Downlink Packet Access (HSPDA) may be used as the wireless Internet technology.

The short distance communication module refers to a module for short distance communication. The short distance communication module may include a Bluetooth module, a radio frequency identification module (RFID) module, an infrared data association module (IrDA) module, ultra wideband (UWB), and ZigBee module.

The server device 200 and the client device 100 may be Bluetooth-connected through the Bluetooth module, and data may be transmitted and received through the Bluetooth connection.

Further, the communication units 110 and 210 allow transmission of data or messages such as command, request, action, and response between devices (initiating device-initiated device).

The user input unit 120 and 220 generates input data for operation control of terminal by user. The user input unit 120 and 220 may be composed of a key pad dome switch, a touch pad (static pressure/static current), a jog wheel, a jog switch, etc.

The output unit 130 and 230 generates output related to visual, auditory, or tactile senses and may include a display module 132 and 232 and a sound output module 134 and 234.

The display module 132 and 232 displays information processed by the device. For example, if the device is call mode, the display module displays a User Interface (UI) or Graphic User Interface (GUI) related to a call. If the device is video telephony mode or photographing mode, the display module displays a photographed or/and received image, a UI, or a GUI.

The display module 132 and 232 may include at least one of a liquid crystal display, a thin film transistor liquid crystal display, an organic light-emitting diode, a flexible display, and a 3D display.

The sound output module 134 and 234 may output audio data received from the communication unit 130 and 230 or stored in the memory 150 and 250 in incoming call mode, communication mode, recording mode, voice recognition mode, and broadcast reception mode. The sound output module 134 and 234 outputs sound signals related to a function (e.g., a received call sound and a received message sound) performed in the device.

The sound output module 134 and 234 may include a receiver, a speaker, and a buzzer.

The microphone may receive a tone transmitted from the opponent device, and the speaker may transmit tone to the opponent device.

The control unit 140 and 240 refers to a module for controlling an overall operation of the host device 100 or HID 200 and may perform control so that a request to transmit a message or the processing of a received message is performed through a Bluetooth interface and another communication interface.

The control unit 140 and 240 may be called a controller, a microcontroller, or a microprocessor and may be implemented by hardware, firmware, software or a combination of them.

The control unit 140 and 240 may include Application-Specific Integrated Circuits (ASICs), other chipsets, logic circuits and/or data processing devices.

The memory 150 and 250 may store a program for operation of the controller 140 and 240 and may temporally store inputted/outputted data. The memory 150 and 250 may store data about vibration and sounds of various patterns which are outputted at the time of a touch input on the touch screen.

The memory 150 and 250 is a medium for storing a variety of types of information of the device. The memory 150 and 250 is connected to the control unit 140 and 240 and may store programs, applications, common files, and input/output data for the operations of the control unit 140 and 240.

The memory 150 and 250 may include at least of a flash memory type, a hard disk type, a multimedia card micro type, card type memory (e.g., SD or XD memory), Random Access Memory (RAM), Static Random Access Memory (SRAM), Read-Only memory (ROM), Electrically Erasable Programmable Read-Only Memory (EEPROM), Programmable Read-Only Memory (PROM), magnetic memory, a magnetic disk and an optical disk. The device may also operate in relation to web storage that performs the storage function of the memory 240 on the Internet.

The power supply 160 and 260 refers to a module for being supplied with external power or internal power and supplying power for the operations of the elements under the control of the control unit 140 and 240.

Hereinafter, the procedure of a Bluetooth low energy (BLE) technology will be explained.

FIG. 3 is a diagram showing the flow of a general connection process of Bluetooth to which an embodiment of the present invention may be applied.

Bluetooth LE procedure may include a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack. When requests are received from all the devices, it is not necessary to respond thereto, and thus, the controller stack may perform control to reduce the number of transmitted requests to reduce power consumption.

A first device (device 1) 300 may perform the device filtering process in order to restrict a device which receives an advertisement packet, a scanning request, or a connection request.

Here, the advertising device refers to a device transmitting an advertisement event, that is, a device performing an advertisement and is also termed an advertiser.

The scanning device refers to a device performing scanning, that is, a device transmitting a scan request.

In Bluetooth LE, when the scanning device receives some advertisement packets from an advertisement device, the scanning device needs transmitting a scanning request to the advertisement device. If the advertisement device, in which the scanning request needs to be transmitted, is filtered in advance, the scanning device may disregard advertisement packets which are transmitted in the advertisement device.

Even in the connection request process, the device filtering procedure may be used. If the advance device filtering procedure for a device, which responds to the connection request in a device which requests connection, is not used, the device, which receives the connection request, (e.g., an advertisement device which has performed the advertisement) needs to respond to the connection request.

The device, which requests a connection, may be expressed as an initiating device or an initiator.

The scanning device may use a device filtering procedure in order to restrict devices to transmit the scanning request or connection request to the advertisement device.

Advertising Procedure

The first device 300, which is an advertisement device, performs an advertisement procedure in order to perform non-directional broadcasts to the devices within the area (S310). Here, non-directional broadcasts refer to broadcasts in all directions, not a broadcast in a certain direction. On the other hand, a directional broadcast refers to a broadcast in a certain direction. The non-directional broadcast is generated output a connection procedure between the advertisement device and a device in the listening state (hereinafter, referred to as "listening device").

The advertisement procedure is used to establish Bluetooth connection with a neighboring initiating device. Further, the advertisement procedure may be used to provide periodic broadcasts of user data to scanning devices which are performing listening in the advertisement channel. In the advertisement procedure, all advertisements (or advertisement event) are broadcast through an advertisement physical channel.

A Bluetooth LE device, which is connected to Bluetooth LE Piconet, may be advertised by using a specific type of the advertisement event.

A second device (device 2) 400, which is a scanning device, may transmit a scanning request in order to obtain additional user data from the advertisement device (S320). The first device 300 transmits a response to the scanning request to the second device 400 which has transmitted the scanning request, through the same advertisement physical channel as the advertisement physical channel which has received the scanning request (S330).

The broadcast user data, which is sent as part of advertisement packets, is dynamic data, but scanning response data is generally static data.

The advertisement device may receive a connection request from the initiating device on the advertisement (broadcast) physical channel. If the advertisement device has used a connectable advertisement event and the initiating device has not been filtered by the device filtering procedure, the advertisement device stops advertisement and enters a connected mode. The advertisement device may restart advertisement after the connection mode.

Scanning Procedure

The second device 400, which performs scanning, performs the scanning procedure in order to listen to a non-directional broadcast of user data from advertisement devices which use the advertisement physical channel.

The second device 400 transmits the scanning request to the advertisement device through the advertisement physical channel in order to request additional user data from the advertisement device (S320). The first device 300, which is the advertisement device, transmits a scanning request to the scanning request including additional user data which has requested in the scanning device through the advertisement physical channel.

The scanning procedure may be used while connected with another Bluetooth LE device in Bluetooth LE Piconet.

If the scanning device receives a broadcasted advertisement event and is in the initiator mode which may initiate the connection request, the second device 400 may start Bluetooth connection with the advertisement device by transmitting a connection request to the first device 300 through the advertisement physical channel (S340).

If the device transmits a connection request to the advertisement device in the second device 400, the scanning device stops initiator mode scanning for an additional broadcast and enters a connection mode.

Discovering Procedure

Devices which allow Bluetooth communication (hereinafter, referred to as "Bluetooth device") perform the advertisement procedure and scanning procedure in order to discover neighboring devices or to be discovered by other devices within a given area.

The discovering procedure is asymmetrically performed. The Bluetooth device, which tries to find other neighboring devices, is called a discovering device, and listens in order to find devices which advertise an advertisement event which allows scanning. The Bluetooth device, which is discovered by another device and is thereby available, is called a discoverable device, and positively broadcasts an advertisement event so that another device may perform scanning through the advertisement (broadcast) physical channel.

Both the discovering device and the discoverable device may already have been connected to other Bluetooth devices in Piconet.

Connecting Procedure

The connection procedure is asymmetric, and while a certain Bluetooth device performs an advertisement procedure, the connection procedure requires performance of the scanning procedure by another Bluetooth device.

That is, the advertisement procedure may be the purpose, and as a result, only one device will respond to the advertisement. After receiving a connectable advertisement event from the advertisement device, the connection may be initiated by transmitting a connection request to the advertisement device through the advertisement (broadcast) physical channel.

Hereinafter, the operation states in BLE technology, i.e., the advertising state, the scanning state, the initiating state, and the connection state, will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The Link Layer enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the Link Layer listens to an advertising channel index in a scan window duration. A scan interval is defined as an interval between start points of two continuous scan windows.

When there is no collision in scheduling, the Link Layer should listen in order to complete all the scan intervals of the scan window as instructed by the host. In each scan window, the Link Layer should scan other advertising channel index. The Link Layer uses every available advertising channel index.

In the passive scanning, the Link Layer only receives packets and cannot transmit any packet.

In the active scanning, the Link Layer performs listening in order to be relied on an advertising PDU type for requesting advertising PDUs and advertising device-related additional information from the advertising device.

Initiating State

The Link Layer enters the initiating state according to an instruction from the host (stack). When the Link Layer is in the initiating state, the Link Layer performs listening on advertising channel indices.

During the initiating state, the Link Layer listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the Link Layer enters the connection state. However, it is not necessary to consider that the connection should be established at a point in time at which the Link Layer enters the connection state. The only difference between a newly generated connection and an already established connection is a Link Layer connection supervision timeout value.

When two devices are connected, the two devices play different roles.

An Link Layer serving as a master is termed a master, and an Link Layer serving as a slave is termed a slave. The master adjusts a timing of a connecting event, and the connecting event refers to a point in time at which the master and the slave are synchronized.

Such a Bluetooth LE procedure adopts only three channels less than the procedure of Bluetooth BR/EDR so as to be used as the advertisement channels, and thus the power of 10 to 20 times less than that of Bluetooth BR/EDR technology is used.

However, the amount of data, which may be transmittable, is reduced than Bluetooth BR/EDR, and thus longer time is needed when transmitting a large amount of data and the power consumption may be increased. Hereinafter, in order to consider the length of data which may be transmitted Bluetooth LE technology, the packet structure of Bluetooth LE will be explained.

FIGS. 4 and 5 are diagrams showing an example of a Bluetooth packet format.

Referring to FIGS. 4 and 5, the Bluetooth LE includes one (a) link layer packet 410 which is used for both the advertisement channel packet and the data channel packet.

Each packet is composed of four fields of a preamble, an access address, a packet data unit (PUD), and CRC.

The length of the PDU is the minimum 2 octets to the maximum 39 octets, and the length of data, which may be transmitted at one time through Bluetooth LE, may be determined according to the length of the PDU.

When one packet is transmitted in the advertisement physical channel, the PDU may be the advertisement channel PDU, and when one packet is transmitted in the data physical channel, the PDU may become the data channel PDU.

PDU (Advertising Channel PDU)

(b) An advertising channel PDU 420 has a 16 bit header 430 and a payload of minimum 0 octet to maximum 31 octets, and (c) the header 430 of the advertising channel PDU may be composed of a PDU type, reserved for future used (RFU), TxAdd, RxAdd, and Length fields.

The TxAdd field and the RxAdd field include information for the PDU type, and the length field indicates the length of the payload field and may be expressed as octet.

When the TxAdd field or the RxAdd field are not defined, this may be used as the RFU field.

The PDU type file indicates the PDU type as defined in Table 1 below.

TABLE 1

| PDU Type | Packet Name |
| --- | --- |
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

The maximum length of the advertising channel PDU is 39 octets, and thus the length of data, which may be transmitted through the advertisement at one time, is 31 octets. Hence, there is a limit in the information which may be provided.

Advertising PDU

The following advertising channel PDU types are called an advertising PDU and are used in the specific event.

ADV_IND: Connectable non-directional advertising event

ADV_DIRECT_IND: Connectable directional advertising event

ADV_NONCONN_IND: Non-connectable non-directional advertising event

ADV_SCAN_IND: Scanning-possible non-directional advertising event

The PDUs are transmitted in the link layer in the advertising state and are received by the link layer in the scanning state or initiating state.

Scanning PDUs

The following advertising channel PDU type is called a scanning PDU and is used in the state which is explained below.

SCAN_REQ: This is transmitted by the link layer in the scanning state and is received by the link layer in the advertising state.

SCAN_RSP: This is transmitted by the link layer in the advertising state and is received the link layer in the scanning state.

Initiating PDUs

The following advertising channel PDU type is called an initiating PDU.

CONNECT_REQ: This is transmitted by the link layer in the initiating state and is received by the link layer in the advertising state.

Data Channel PDU

The (a) data channel PDU 510 of FIG. 5 has a 16 bit header and payloads of various lengths and may include a message integrity check (MIC).

The data channel PDU header 520 may be composed of a logical link identifier (LLID), a next expected sequence number (NESN), a sequence number (SN), more data (MD), and a length field.

The LLID field includes information for identifying whether the data channel PDU is LL data PDU or LL control PDU.

The NESN field and the SN field are fields which perform acknowledge (ACK) function when transmitting and receiving data. When transmitting data, the SN field value is compared with the NESN field value. Then if the values are the same, it is considered as NAK (negative acknowledge), and previous data is sent again. If the values are not the same, the SN field value (SN field is 1 bit information, and thus 0 or 1) is increased and new data may be transmitted.

When receiving data, the SN field value is compared with the NESN field value are compared. If the values are the same, the NESN field value is increased and new data is received, and if different, it is considered as NAK and received data is disregarded.

At this time, if received data is broken, the NESN field value is not changed, and thus when transmitting the next packet, the SN field value and the NESN field value become the same and thus data is retransmitted.

The MD field may be used to indicate that there are other data to be transmitted by the device.

In the data channel PDU, the PDU length of the link layer packet 410 is determined as the maximum 39 octets, and thus the length of data, which can be transmitted at one time, is limited to 37 octets.

As considered with reference to FIGS. 4 and 5, the purpose of the Bluetooth LE technology is to quickly transmit a small amount of data by using low power, and thus the length of data, which may be transmitted at one time through the advertising channel PDU, is limited and thereby transmission of a large amount of data takes longer time and power consumption may increase.

Hereinafter, the data format setting method and data format for solving this problem will be considered.

FIG. 6 is a diagram showing an example of a packet format for improving the data transmission rate to which an embodiment of the present invention is applied.

Referring to FIG. 6, the length of data, which may be transmitted at one time, by setting the length of the PDU of the link layer packet to be greater than that of the PDU of the existing link layer packet.

Specifically, in Bluetooth LE technology, the length of the PDU including data to be transmitted in (a) link layer packet 610 which is used in the advertising channel packet and the data channel packet may be extended to the maximum 249 octets.

As the PDU length of the link layer packet 610 is extended, the lengths of the advertising channel PDU and the data channel PDU which use the link layer packet 610 format may be extended to the maximum 249 octets, and the payload may also be extended to the maximum 245 octets.

Further, in order to use such an extended link layer packet, whether the extended link layer packet is supported needs to be informed of other devices. Hence, the long length field is added to the header 620 of the advertising channel PDU and the header 630 of the data channel PDU, and thereby it may be notified whether the extended link layer packet is supported to other devices.

Further, as the length of the link layer PDU is extended, the payload length of the link layer PDU is also extended, and thus the length of the length field, which indicates the length of the payload in the advertising PDU header 620 and the data channel PDU header 630, is also changed to 8 bits so that the length of the extended payload may be indicated. The packet format of FIG. 6 may be used in the following embodiment.

AdvData field 830 of (c) advertisement channel PDU may include AdvData type which indicates the type of the advertising message or frame, maximum RX LE payload size field which indicates the receivable maximum data length, and maximum TX LE payload size field which indicates the transmittable maximum data length.

The second device, which receives the advertising message or frame, may understand whether the first device 300 supports the extended LE packet through the length field which is included in the header of the frame or the advertising message, and a connection request may be transmitted to the first device 300 based on information which is included in the received advertising message or frame (S720).

At this time, the data channel PDU payload 910 of the connection request may include InitA field, AdvA field, and LL data field.

The InitA ma include the address of the device which performs a connection request, for example, the address of the second device 400 of FIG. 7.

The LL data field may include the field of Table 2, Tx payload size, Rx payload size, maximum RX LE payload size, and maximum TX LE payload size field of FIG. 9.

TABLE 2

| AA (4 octets) | CRClint (3 bits) | WinSize (3 bits) | WinOffset (3 bits) | Interval (3 bits) | Latency (3 bits) | Timeout (3 bits) | ChM (3 bits) | Hop (3 bits) | SCA (3 bits) |
| --- | --- | --- | --- | --- | --- | --- | --- | --- | --- |

When such an extended packet format is used, the length of the transmittable data becomes greater, compared with the existing packet format, and when transmitting a large amount of data, the number of times which exchange data between devices is reduced, thereby the data transmission time is reduced, and thereby the power consumption of the device may also be reduced.

FIGS. 7 to 9 are diagrams showing a process for negotiating a packet length in the Bluetooth connection process and an example of a packet format.

Referring to FIGS. 7 to 9, the data length may be negotiated through the advertisement and connection request.

Specifically, if the first device 300 tries to connect to the device through Bluetooth LE technology, the first device 300 may transmit an advertisement message or frame to the second device 400 (S710).

The advertisement message or frame has the same format as that of the link layer 610 of FIG. 6, and if the first device 300 supports the extended link layer PDU, this can be notified to the second device 400 through the advertisement channel PDU header 620 of FIG. 6.

The PDU payload of the advertisement message or frame may have the format of (a) or (b) of FIG. 8. For example, the PDU payload of the ADV_IND, the ADV_NONCON-N_IND, and the ADV_SCAN_IDN has the same packet format as that of (a) of FIG. 8, and the ADV_DIRECT_IND has the same packet as that of (b) of FIG. 8.

The advertisement channel PDU payload of (a) and (b) of FIG. 8 commonly includes AdvA field including the address of the first device 300 which is the advertising device, and AdvData field including the supported data length.

The (b) advertising PDU payload 820, which is used in the ADV_DIRECT_INT, may further include InitA field which indicates the address of the device which requests connection.

The AA field includes an access address for link layer connection.

The CRCInt field includes an initial setting value for cyclical redundancy check (CRC) calculation which notifies of whether the content of the frame has been changed during transmission.

The WinSize field includes the value for the length of the section where the actual data can be transmitted within a single connect Interval, and the WinOffset field may include an offset value until the actual transmit window is started within the connect interval.

The interval field may include an interval between connect events.

The latency field is used to cancel connection when there is no data exchange during a specific event while connection is maintained.

The timeout field includes time includes time which is judged as connection-impossible when the device cannot further connect.

The chM field includes information of the channel which is used and the channel which is not used at the channel hopping, and the hop field includes the distance value to the following channel when the channel hopping is performed in Bluetooth LE.

The SCA field may include sleep clock accuracy information of the master device, and the accuracy level is shown in Table 3 below.

TABLE 3

| SCA | masterSCA |
| --- | --- |
| 0 | 251 ppm to 500 ppm |
| 1 | 151 ppm to 250 ppm |
| 2 | 101 ppm to 150 ppm |
| 3 | 76 ppm to 100 ppm |
| 4 | 51 ppm to 75 ppm |
| 5 | 31 ppm to 50 ppm |

TABLE 3-continued

| SCA | masterSCA |
|---|---|
| 6 | 21 ppm to 30 ppm |
| 7 | 0 ppm to 20 ppm |

Maximum RX LE payload size field of FIG. 9 includes the maximum data length which may be received by the second device 400, and the maximum TX LE payload size field may include the maximum data length which may be transmitted by the first device 300.

The Tx payload size and the Rx payload size field include data length information which is to be used in the transmission and reception of data which is determined by the negotiation of the second device 400.

That is, the minimum value among the maximum receiving data length, which is received from the first device 300 and the maximum data length of the second device 400 may be determined as the Tx payload size, and the minimum value among the maximum transmission data length which is received from the first device 300 and the maximum receiving data length which may be self-provided may be determined as the Rx payload size.

The Formula 1 below is an equation for determining the Tx payload size, and the Formula 2 below is an equation for determining the Rx payload size.

$$RX\ Payload\ Siz=Min(Peer\ Maximum\ TX\ LE\ Payload\ Size, Maxumum\ RX\ Payload\ Size) \quad [Equation\ 1]$$

$$TX\ Payload\ Size=Min(Peer\ Maximum\ RX\ LE\ Payload\ Size, Maximum\ TX\ Payload\ Size) \quad [Equation\ 2]$$

For example, when the maximum transmission payload value, which may be supported by the first device 300, is 150, and the maximum receiving payload value is 150, and the maximum transmission payload value, which may be supported by the second device 400, is 230, and the maximum receiving payload value is 230, if the first device 300 transmits the advertising message or frame, in which AdvData Type is 0xF3FB, the maximum RX LE payload size value is 150, and the maximum TX LE payload size value is 150, to the second device 400, the second device 400 may understand that the maximum of the receiving payload length and the transmitting payload length of the first device 300 is 150.

The LL data field may include the field of Table 2, the Tx payload size field, and the Rx payload size field.

Thereafter, when the maximum receiving payload value, which may be supported by the second device 400, is 230, and the maximum transmission payload value is 230, the second device 400 may determine the RX payload size as 150 and the TX payload size value as 150 so as to transmit a connection request to the first device 300.

The first device 300 and the second device 400 may extend the payload length through such a method and may transmit and receive data through the extended payload.

As another embodiment of the present invention, the first device 300 informs the second device 400 of the extended LE packet through the advertising message or advertising frame, but the first device 300 may not inform of the value of the maximum RX LE payload size and the value of the maximum TX LE payload size.

In this case, the second device 400 tries connection to the first device 300 with a general data length which is not the extended LE packet and may inform the first device 300 of the value of the maximum RX LE payload size and the value of the maximum TX LE payload size through a connection request.

In the present embodiment, connection is not made with the extended data length, but later, for the case where the data length is extended, information of the second device 400 is transmitted to the device 300.

FIGS. 10 and 11 are diagrams showing a process for negotiating a packet length through a scanning request and scanning response in the Bluetooth connection process and an example of a packet format.

Referring to FIGS. 10 and 11, the Bluetooth LE data length may be extended by providing the data length extension request and information through the scanning request which requests additional device information during Bluetooth LE connection.

Specifically, when the first device 300 tries connection to the second device 400 through Bluetooth LE technology, the first device 300 may transmit an advertisement message or frame to the second device 400 (S1010).

The advertisement message or frame may have the same format as that of the link layer format 610 of FIG. 6.

When the first device 300 supports an extended link layer PDU, the first device 300 ay inform the second device 400 of the fact that the extended link layer PDU is supported, through the length field of the advertisement channel PDU header.

The advertisement channel PDU payload 1110 of the advertisement message or frame may include AdvA field and Adv data field.

The AdvA field may include the address of the first device 300 which is an advertisement device and may include information of the first device 300. However, in the present embodiment, unlike FIGS. 7 to 9, the AdvData field does not include extended packet length information which is supported by the first device 300.

Hence, the second device 400 may transmit a scanning request to the first device 300 in order to obtain extended packet length information which is supported by the first device 300 (S1020).

The packet format of the scanning request is the same as that of the link layer packet 610 of FIG. 6, and the header may also have the same packet structure as that of the advertisement channel PDU header 620 of FIG. 6.

At this time, in the scanning request header, the long length field is used to request supported data length information to the first device 300.

The (b) scanning request PDU payload 1120 of the scanning request may include ScanA field and AdvA field, and the ScanA includes the address of the second device 400 which is a device which requests information, and the AdvA field includes the address of the first device 300.

The first device 300, which has received the scanning request, may include self-supported packet length information in the scanning response and transmit the information to the second device 400 (S1030).

The scanning response may include (c) scanning response PDU payload 1130, and the scanning response PDU payload 1130 may include Adv field including address of the first device 300 which is a device that provides scanning information, and ScanRspData field including additional information.

The Scan RspData field may include ScanRspData type field, maximum RX LE payload size field, and maximum TX LE payload size field which indicate the message type.

The second device 400, which receives transmission of the scanning response, negotiates the length of the data packet in the same method as the method explained in FIGS. 7 to 9, then in order to perform Bluetooth connection with a negotiated new data length, a connection request may be transmitted to the first device 300 (S1040).

For example, when the maximum transmission and reception data length, which may be supported by the first device 300, is 150, and the maximum transmission and reception data length, which may be supported by the second device 400, is 230, the second device 400 may set RX/TX payload size as 150 by negotiation.

The data channel PDU payload format of the connection request is the same as that of FIG. 9, and the format of the LL data may include the field of Table 1, Tx payload size field, Rx payload size field, maximum RX LE payload size field, and maximum TX LE payload field of FIG. 9.

FIGS. 10 and 11 are diagrams showing an embodiment of performing a connection request with the extended data length format by obtaining the supportable maximum transmission and reception data length information through a scanning request and a scanning response when the first device 300 notifies the second device 400 of only whether the extended data packet is supported.

Through the present embodiment, when connection is made by using Bluetooth LE technology, a packet having a data length which is more extended than the existing data packet length may be used, and thereby when transmitting a large amount of data, the number of times of packet transmission and the data transmission time are reduced, and the power consumption of the device is reduced.

FIGS. 12 to 14 are diagrams showing a process for negotiating a packet length through a scanning request and a scanning response in the Bluetooth connection process and another example of a packet format to which the present invention is applied.

Referring to FIGS. 12 to 14, the first device 300 may inform neighboring devices of whether the extended data packet is supported, through advertisement, and thereby the second device 400 may be Bluetooth-connected to the first device 300 with the extended data packet format.

Specifically, when the first device 300 tries connection to the second device 400 through Bluetooth LE technology, the first device 300 may transmit an advertisement message or frame to the second device 400 (S1210).

The advertisement message or frame has the same format as that of the link layer packet 610 of FIG. 6, and when the first device 300 supports the extended link layer PDU, the fact that the extended link layer PDU is supported may be notified to the second device 400 through the length field of the advertisement channel PDU header of FIG. 6.

The advertisement message or frame includes an advertisement channel PDU payload 310, and the advertisement channel PDU payload 1410 may include AdvaA field and AdvData field.

However, in the present embodiment, unlike FIGS. 7 to 9, the AdvData field does not include extended packet length information which is supported by the first device 300.

Hence, the second device 400 may request a scanning request to the first device 300 in order to obtain additional information of the first device 300 (S1220).

The packet format of the scanning request is the same as that of the link layer packet 610 of FIG. 6, and the header may also have the same packet structure as that of the advertisement channel PDU header 620.

At this time, in the header of the scanning request, the long length field is used to request supported data length information to the first device 300.

The scanning request includes scanning request PDU payload 1320, and the scanning request PDU payload 1320 may include ScanA field, AdvA field, and ScanReqData field.

The ScanReqData field includes extended packet length information which is supported by the second device 400.

The ScanReqData field may include ScanReqData type field, maximum RX LE payload size field, and maximum TX LE payload size field which indicate the type of the ScanReqData.

The maximum RX LE payload size field includes maximum receiving data length information which may be supported by the second device 400, and the maximum TX LE payload size field includes maximum transmission data length information which may be supported by the second device 400.

The first device 300, which has received the scanning request, may include the self-supported packet length information in the scanning response and transmit the information to the second device 400 (S1230).

The scanning response may include a (c) scanning response PDU payload 1330, and the (c) scanning response PDU payload 1330 may include the address of the first device 30, which is a device that provides scanning information, and ScanRspData field including the scanning information.

The Scan RspData field may include ScanRspData type, the maximum RX LE payload size field, and the maximum TX LE payload size field, which indicate the message type.

The second device 400, which receives the transmitted scanning response, negotiates the length of the data packet in the same method as the method explained in FIGS. 7 to 9, then may transmit a connection request to the first device 300 with a negotiated new data length (S1240).

The connection request may include the data channel PDU payload 1410, and the data channel PDU payload may include InitA field, AdvA field, and LL data field.

The LL data field may include the field of the above Table 2, Tx payload size field, and Rx payload size field.

The Tx payload size field may include new negotiated transmission data length information, and the Rx payload size field may include new negotiated receiving data length information.

For example, the second device 400, which comes to understand that the first device 300 supports the extended packet through advertisement, may transmit a scanning request including information that the supportable maximum transmission and reception data length is 150 octets, to the first device 300.

The first device 300 may transmit a scanning response including information that the supportable maximum transmission and reception data length is 170 octets, to the second device 400 in response to the scanning request.

Thereafter, the second device 400 may determine 150 octets, which is the minimum value among the maximum transmission and reception data length of the first device 300 and the maximum transmission and reception data length of the second device 400 itself, as the extended data length, and a connection request including the determined value may be transmitted to the first device 300.

The embodiments of FIGS. 12 to 14 are different from the embodiments of FIGS. 10 and 11 in that the second device 400 transmits supported maximum data length information along with the scanning request when the second device 400 transmits a scanning request to the first device 300.

FIGS. 15 and 16 are diagrams showing a process for using a scanning response which is extended through packet length negotiation in the Bluetooth connection process and an example of a packet format to which the present invention is applied.

Referring to FIGS. 15 and 16, a scanning response message may be transmitted by using an extended data packet according to whether the extended data packet is supported in the Bluetooth connection process.

Specifically, if the first device 300 tries connection to the second device 400 through Bluetooth, the first device 300 may transmit an advertisement message or frame to the second device 400 (S1510).

The advertisement message or frame has the same format as the link layer packet 610, and when the first device 300 supports the extended link layer PDU, the fact that the extended link may PDU is supported may be notified to the second device 400 through the length field of the advertisement channel PDU header 620 of FIG. 6.

At this time, the PDU type field of the advertisement channel PDU header may have the value of "0110", which is the value of ADV_SCAN_IND that indicates a scanning-possible non-directional advertisement event in Table 1.

The advertisement message or frame may include (a) advertisement channel PDU payload 1610, and the advertisement PDU payload 1610 may include AdvA field and Adv data field.

The AdvData field may include AdvData type which indicates the type of the advertisement message or frame, the maximum RX LE payload size field which indicates the receivable maximum data length, and the maximum TX LE payload size field which indicates the transmittable maximum data length.

The second device 400 receives an advertisement message or frame which allows a scanning request and has been transmitted from the first device 300, and thus the second device 400 may transmit a scanning request which requests additional information of the first device 300 (S1520).

The scanning request may include (b) scanning request PDU payload 1620, and the scanning request PDU payload 1620 may include ScanA field, AdvA field, or ScanReqData field.

The ScanReqData field is a field including information including information on the maximum data length which may be supported by the second device 400 itself, and may include ScanReqData type field, maximum RX LE payload size field, and maximum TX LE payload size field.

The ScanReqData type field includes information on the data type of the scanning request, and the maximum RX LE payload size field includes information on the length of the maximum receiving data packet which may be supported by the second device 400.

The maximum TX LE payload size field includes information on the maximum receiving data packet which may be supported by the second device 400.

The first device 300, which has received a scanning request, may negotiate the extended receiving data length and the extended transmission data length based on information on the maximum data packet length which may be supported by the second device 400 and the maximum data packet length which may be supported by the first device 300.

That is, the first device 300 may determine the extended receiving data length or extended transmission data length as the minimum value among the maximum transmission and reception data lengths which may be supported by the first device 300 and the second device 400 by using the above formula 1 and formula 2.

For example, when the length of the maximum transmission and reception data packet, which may be supported by the first device 300, is 150 octets, and the length of the maximum transmission and reception data packet, which may be supported by the second device 400, is 130 octets, the first device 300 may determine the extended transmission and reception data length as 130 octets.

Thereafter, the first device 300 may transmit a scanning response to the second device 400 by using the data format to which the extended data packet length has been applied (S1530).

The scanning response may include (c) scanning response PDU payload 1630, and the scanning response PDU payload 1630 may include AdvA field and ScanRspData field.

The ScanRspData field may have the same length (e.g., 130 octets) as that of the value of the extended transmission data length which has been negotiated by the first device 300.

FIGS. 17 and 18 are diagrams showing a process for changing the packet length after Bluetooth connection and a packet format to which the present invention is applied.

Referring to FIGS. 17 and 18, after the transmission and reception data length is negotiated in the Bluetooth connection procedure, the negotiated transmission and reception data length may be changed during the data transmission and reception.

Specifically, the first device 300 may transmit an advertisement message or frame for Bluetooth connection (S1710). At this time, the advertisement message or frame has the same packet format as that format which has been explained in FIGS. 6 and 8.

The second device 400, which has received the advertisement message or frame, is not illustrated in FIG. 17, but when necessary (e.g., when additional information is needed), a scanning request may be transmitted to the first device 300, and the second device 400, which has received the scanning request, may transmit the scanning response to the first device 300.

Thereafter, the second device 400 performs Bluetooth connection by transmitting a connection request including information for Bluetooth connection (S1720).

In the process of Bluetooth connection the first device 300 and the second device 400 may negotiate the extended transmission and reception data packet length through one of methods which have been explained with reference to FIGS. 7 to 16.

Thereafter, the first device 300 transmits the maximum data length change request 1810 to the second device 400 when the length of the transmission and reception data packet needs to be changed while the second device 400 transmits and receives data by using a data packet to which the negotiated length of the transmission and reception data packet is has been applied (S1730).

The maximum data length change request 1810 may include Op code field and CtrData field. The Op code field indicates types of link layer (LL) control packets which transmit Bluetooth control command and may have the value of Table 4.

TABLE 4

| Opcode | Control PDU Name |
|---|---|
| 0x00 | LL_CONNECTION_UPDATE_REQ |
| 0x01 | LL_CHANNEL_MAP_REQ |
| 0x02 | LL_TERMINATE_IND |
| 0x03 | LL_ENC_REQ |

TABLE 4-continued

| Opcode | Control PDU Name |
|---|---|
| 0x04 | LL_ENC_RSP |
| 0x05 | LL_START_ENC_REQ |
| 0x06 | LL_START_ENC_RSP |
| 0x07 | LL_UNKNOWN_RSP |
| 0x08 | LL_FEATURE_REQ |
| 0x09 | LL_FEATURE_RSP |
| 0x0A | LL_PAUSE_ENC_REQ |
| 0x0B | LL_PAUSE_ENC_RSP |
| 0x0C | LL_VERSION_IND |
| 0x0D | LL_REJECT_IND |
| 0x0E | LL_SLAVE_FEATURE_REQ |
| 0x0F | LL_CONNECTION_PARAM_REQ |
| 0x10 | LL_CONNECTION_PARAM_RSP |
| 0x11 | LL_REJECT_IND_EXT |
| 0x12 | LL_PING_REQ |
| 0x13 | LL_PING_RSP |
| 0x14 | LL_LENGTH_REQ |
| 0x15 | LL_LENGTH_RSP |
| 0x16 | LL_Window_REQ |
| 0x17-0xFF | Reserved for Future Use |

In this case, the Op code field is the transmission of the control packet for changing the maximum transmission and reception data length and thus the Op code field may have "0x14" value of the above Table 4.

The CtrData field may include RX LE payload size field including information on the length of the received data to be changed and TX LE payload size including information on the length of the transmitted data to be changed.

The second device 400, which has received the maximum data length change request, may transmit the maximum data length change response 1820 to the first device 300 in response thereto so as to change the maximum data length (S1740).

The maximum data length change response 1820 may include Op code field and Ctr data field.

The Op code is the Op code of the response to the maximum data length change request and thus the Op code may include "0x15" value of the above Table 2.

The Ctr Data field may include Rsp code field, RX LE payload size field, and TX LE payload size field.

The Rsp code field may include information related with whether the second device 400 is allowed with respect to the maximum data length change of the first device 300 and may include OK (allow change), NEW (provide new value), and Reject (acceptance impossible).

The RX LE payload size field and the TX LE payload size field include length information of the transmission and reception data packet which has been changed based on the change request of the first device 300.

As an example of the transmission and reception data packet length change, if the first device 300 tries to change the data length to 150 octets, the first device 300 may transmit the maximum data length change request to the second device 400 by setting the values of the RX LE payload size field and the TX LE payload size field respectively to 150 octets.

When the second device 400, which has received the maximum data length change request, decides to change the length of the transmission and reception data packet to 150 octets or a value less than 150 octets (e.g., 120 octets), the Rsp code may be set as OK value which allows the change.

However, when the second device 400 decides not to change the data length, the Rsp code may be set as Reject value which indicates acceptance-impossible.

When Rsp type field is set as Reject value, the maximum data length change will not be allowed, and thus CtrData of the maximum data length change response 1820 may not include values of the RX LE payload size field and the TX LE payload size field.

If the second device 400 tries to change the transmission and reception data length with 180 octets which is a value greater than the value which is intended to be changed by the first device 300, a new transmission and reception data length value and the Rsp code value are set as New so that the maximum data response may be transmitted to the first device 300.

The first device 300, which receives the maximum data length change response where Rsp code has been set as New, from the second device 400, the first device 300 may determine whether a newly suggested data length value is allowed.

That is, the first device 300 may determine OK (change-allowed), NEW (new value provided), or Rejection (acceptance-impossible) again for the data length value which has been re-suggested by the second device 400.

Thereafter, the first device 300 may change the maximum transmission and reception data length by transmitting the maximum data length change response to the second device 400.

At this time, in the case where 180, which is the maximum data length value that is provided by the second device 400, is possible only when transmitting data, the first device 300 may set Rsp code value to OK, RX LE payload size field value to 150, and the TX LE payload size field value to 180 so as to transmit the maximum data change response to the second device 400.

Through the above-explained data packet length change process, the data packet length, which has been negotiated at the Bluetooth connection operation or after Bluetooth connection, may be extended or reduced.

That is, when the first device 400 and the second device 400 determine the data packet length as a value less than 150 octets by negotiation in the connection operation, the data packet length change procedure has performed the data length change procedure in order to extend the data length after the Bluetooth connection.

However, when the first device 300 and the second device 400 determine the data length as 180 octets or greater by negotiation in the connection operation, the data packet length change procedure has performed the data length change procedure in order to reduce the data length after Bluetooth connection.

Such a change of the data length may be generated as needed in the process of transmitting and receiving data after the Bluetooth connection.

For example, when the amount of data becomes large in the process of transmitting data by the first device 300 and the second device 400 by using Bluetooth LE technology, the data length may be extended through a data length change procedure.

However, when the amount of data, which is transmitted and received by the first device 300 and the second device 400, is reduced, the data packet of a long length may increase a bit error rate.

Hence, in such a case, the data packet length may be reduced through the data length change procedure.

FIGS. 19 and 20 are diagrams showing a process for extending a packet length after Bluetooth connection and a packet format thereabout to which the present invention is applied.

Referring to FIGS. 19 and 20, non-connected devices are connected by using Bluetooth LE technology, then the packet length may be adjusted by negotiation on the packet length.

Specifically, the first device 300 and the second device 400 initially exist in non-connected state which is not mutually connected (S1900).

At this time, when the Bluetooth module of the first device 300 is activated, the first device 300 transmits an advertisement message or frame including information of the first device 300 itself, to the second device 400 for Bluetooth connection (S1910).

When the device that is intended to be connected by the first device 300 is correct, the second device 400, which has received the advertisement message or frame, requests a connection request to the first device 300 for Bluetooth connection (S1920).

The connection request is a message for performing a connection procedure with the slave device by the master device in a non-connected state, and at this time, all schedule parameter values, which are used in the connection state as below, may be set.

Transmit Window Size: It means the length of the section where actual data may be transmitted and received within a single connect interval, and at least one packet needs to be certainly transmitted or received.

Window_offset: Offset until actual transmit window is started within connect interval.

Connect Interval: Interval between connect events.

The first device 300, which has received the connection request, tries Bluetooth connection by setting the schedule parameter value with the second device 400, and when connected, the first device 300 and the second device 400 become in a connected state (S1930).

The first device 300 and the second device 400 in the connected state may transmit and receive data, request or provide certain control information through a control packet, or direct a specific operation.

In the connected state, in Bluetooth LE technology, generally a short data packet is used. Hence, in order to use an extended packet, one of the two devices may request data packet extension, and before that, the opponent device needs to check whether the extended data packet is supported.

Hence, the first device 300 and the second device 400 may transmit a feature request in order to check whether the extended data packet is supported (S1940).

The second device 400, which has received the feature request, may inform the first device 300 of whether the extended data packet is supported, through the feature response (S1950).

When the second device 400 supports the extended data packet, the first device 300 requests a length extension to the second device 400 in order to extend the data packet (S1960).

The length extension request 2010 may include Op code field and CtrData field, and the Op code may has the value of "0x14" of the above Table 2.

The CtrData field may include MaxRxLen field, MaxRx-Time field, MaxTxLen field, and MaxTxTime field.

The MaxRxLen field includes the length information of the maximum receiving data packet which may be supported by the first device 300, and the length of the maximum data packet may be expressed as octet value.

The MaxRxtime field includes the transmission time information of the maximum receiving data packet which may be supported by the first device 300.

The MaxTxLen field includes length information of the maximum transmission data packet which may be supported by the first device 300, and the length of the maximum data packet may be expressed as octet value.

The MaxTxTime field includes transmission time information of the maximum transmission data packet which may be supported by the first device 300.

The second device 400, which has received the length extension request 2010, transmits a length extension response to the first device 300 (S1970).

The length extension response has the same format as that of the length extension request, and in this case, Op code may have the value of "0x15" of the above Table 2.

The first device 300 and the second device 400 may obtain the maximum data packet information which may be supported by the opponent device, through the length extension request 2010 and the length extension response and may negotiate the extended packet length and time.

The first device 300 and the second device 400 determines the minimum value among lengths of the transmission and reception data packets which may be supported by the second device 400 itself and the opponent device, as the length of the extended transmission and reception packet by negotiation, and determines the minimum value among data transmission and reception times, which may be supported by the second device 400 itself and the opponent device, as the extended data transmission and reception time by negotiation.

Thereafter, when the length of the determined, extended data packet cannot be transmitted and received within the transmit window size which has been set through the connection request, the first device 300 may transmit a window size update request to the second device 400 in order to change the transmit window size (S1980).

The window size update request 2020 includes Op code field and CtrData field, and in this case, the Op code may have the value of "0x16".

The CtrData field may include window size field and connect interval field.

The window size includes window size information which is intended to be changed in order to transmit and receive the extended packet, and the connect interval field may include interval information between the connect events for the changed window size.

The second device 400, which has received the window size update request, transmits a response thereto to the first device 300 so as to perform window size update (S1990).

After the data packet length is extended, the first device 300 and the second device 400 may extend or reduce the data packet length through the maximum data length change procedure of FIG. 17 when the data packet length needs to be changed.

Through such a method, even after Bluetooth connection, the length of the data packet may be extended or changed, and the change of the schedule parameter according to length extension of the data packet is also possible.

Further, by changing the length of the data packet according to the amount of transmitted and received data, when a large amount of data is transmitted, the number of times of transmission and transmission time of the data packet may be reduced by extending the packet length, and thereby power consumption may also be reduced.

Further, even when the amount of transmitted and received data is reduced after extension of the data packet, the length of the data packet may be reduced again, and thus the length of the data packet according to the situation may be flexibly changed.

The above embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

The invention claimed is:

1. A method of extending a data length of Bluetooth communication by a first device in a wireless communication system, the method comprising:
receiving a first message including information of a second device from the second device;
transmitting a connection request message to the second device based on the first message;
establishing Bluetooth connection with the second device based on the connection request message;
transmitting an extension request message which requests extension of a transmission data length and a reception data length through the Bluetooth connection;
receiving an extension response message in response to the extension request message through the Bluetooth connection; and
negotiating the transmission data length and the reception data length with the second device,
wherein the extension request message includes at least one of first maximum transmission data length information, first maximum reception data length information, first maximum transmission time information, or first maximum reception time information of the first device,
wherein the extension response message includes at least one of second maximum transmission data length information, second maximum reception data length information, second maximum transmission time information, or second maximum reception time information of the second device,
wherein the transmission data length is negotiated based on at least one of third maximum transmission data length information or third maximum transmission time information,
wherein the reception data length is negotiated based on at least one of third maximum reception data length information or third maximum reception time information,
wherein the third maximum transmission data length information is determined by negotiation as a smaller value among the first maximum transmission data length information and the second maximum reception data length information,
wherein the third maximum transmission time information is determined by negotiation as a smaller value among the first maximum transmission time information and the second maximum reception time information,
wherein the third maximum reception data length information is determined by negotiation as a smaller value among the first maximum reception data length information and the second maximum transmission data length information, and
wherein the third maximum reception time information is determined by negotiation as a smaller value among the first maximum reception time information and the second maximum transmission time information.

2. The method of claim 1, wherein the connection request message includes at least one of window size information, window offset information, or connect interval information.

3. The method of claim 1, further comprising:
transmitting a window size update request message for changing a window size; and
receiving a response message in response to the window size update request message.

4. A method of changing a data length of Bluetooth communication by a first device in a wireless communication system, the method comprising:
receiving first information related with whether extension of a transmission data length and a reception data length is supported, from a second device;
receiving second information related with a data length of the second device from the second device;
negotiating the data length based on the second information and third information related with a data length of the first device;
transmitting the negotiated data length to the second device,
wherein the second information includes at least one of first maximum transmission data length information, first maximum reception data length information, first maximum transmission time information, or first maximum reception time information,
wherein the third information includes at least one of second maximum transmission data length information, second maximum transmission time information, or second maximum reception time information,
wherein the negotiated data length includes at least one of a transmission data length, a reception data length, a transmission time, or a reception time,
wherein the transmission data length indicates a smaller value among the second maximum transmission data length information and the first maximum reception data length information,
wherein the reception data length indicates a smaller value among the second maximum reception data length information and the first maximum transmission data length information,
wherein the transmission time indicates a smaller value among the second maximum transmission time information and the first maximum reception time information, and
wherein the reception time indicates a smaller value among the second maximum reception time information and the first maximum transmission time information.

5. The method of claim 4, wherein the first information and the second information are included in one message so as to be simultaneously transmitted.

6. The method of claim 4, further comprising:
transmitting a request message which requests the second information.

7. The method of claim 4, further comprising:
transmitting a change request message which requests a change of the negotiated data length; and
receiving a change response message in response to the change request message.

8. The method of claim 7,
wherein the change request message includes at least one of first reception data length information or first transmission data information, and
wherein the change response message includes at least one of response information related with whether the change request is allowed, second reception data length information, or second transmission data length information.

9. The method of claim 8,
wherein the second reception data length information is determined based on the first reception data length information, and
wherein the second transmission data length information is determined based on the first transmission data length information.

10. An apparatus for extending a data length of Bluetooth communication in a wireless communication system, the apparatus comprising a first device which comprises:
a transceiver configured to transmit and receive signals; and
a controller functionally connected to the transceiver, wherein the controller:
receives a first message including information of a second device from the second device,
transmits a connection request message to the second device based on the first message,
establishes Bluetooth connection with the second device based on the connection request message,
transmits an extension request message which requests extension of a transmission data length, and a reception data length through the Bluetooth connection, and
receives an extended response message in response to the extension request message through the Bluetooth connection,
wherein the extension request message includes at least one of first maximum transmission data length information, first maximum reception data length information, first maximum transmission time information, or first maximum reception time information of the first device,
wherein the extension response message includes at least one of second maximum transmission data length information, second maximum reception data length information, second maximum transmission time information, or second maximum reception time information of the second device,
wherein the controller negotiates a transmission data length and a reception data length,
wherein the transmission data length is negotiated with the second device based on at least one of third maximum transmission data length information or third maximum transmission time information,
wherein the reception data length is negotiated based on at least one of third maximum reception data length information or third maximum reception time information,
wherein the third maximum transmission data length information is determined by negotiation as a smaller value among the first maximum transmission data length information and the second maximum reception data length information,
wherein the third maximum transmission time information is determined by negotiation as a smaller value among the first maximum transmission time information and the second maximum reception time information,
wherein the third maximum reception data length information is determined by negotiation as a smaller value among the first maximum reception data length information and the second maximum transmission data length information, and
wherein the third maximum reception time information is determined by negotiation as a smaller value among the first maximum reception time information and the second maximum transmission time information.

11. The apparatus of claim 10, wherein the connection request message includes at least one of window size information, window offset information, or connect interval information.

12. The apparatus of claim 10, wherein the controller transmits a window size update request message for changing a window size and receives a response message in response to the window size update request message.

* * * * *